(12) United States Patent
de Pauw Gerlings

(10) Patent No.: US 7,378,073 B2
(45) Date of Patent: May 27, 2008

(54) LIME TREATMENT

(75) Inventor: Johannes Hendrikus Martinus de Pauw Gerlings, St. Genis-Pouilly (FR)

(73) Assignee: CalCiTech, Ltd, Hamilton (BM)

( * ) Notice: Subject to any disclaimer, the term of this patent is extended or adjusted under 35 U.S.C. 154(b) by 0 days.

(21) Appl. No.: 11/273,150

(22) Filed: Nov. 14, 2005

(65) Prior Publication Data

US 2006/0067869 A1 Mar. 30, 2006

Related U.S. Application Data

(63) Continuation of application No. 09/857,680, filed on Sep. 13, 2001, now abandoned.

(51) Int. Cl.
*C01F 11/18* (2006.01)

(52) U.S. Cl. .................................... 423/432

(58) Field of Classification Search ............. 423/432
See application file for complete search history.

(56) References Cited

U.S. PATENT DOCUMENTS

| | | | |
|---|---|---|---|
| 3,340,003 A | | 9/1967 | Judd |
| 3,669,620 A | | 6/1972 | Bennett et al. |
| 4,237,147 A | * | 12/1980 | Merten et al. ............... 426/590 |
| 4,760,138 A | | 7/1988 | So et al. |
| 5,332,564 A | | 7/1994 | Chapnerkar et al. |
| 5,558,850 A | * | 9/1996 | Bleakley et al. ............ 423/432 |
| 5,846,500 A | | 12/1998 | Bunger et al. |

FOREIGN PATENT DOCUMENTS

| | | |
|---|---|---|
| BE | 1 003 269 A | 2/1992 |
| EP | 0 286 564 A | 10/1998 |
| WO | WO 93/05132 | 3/1993 |
| WO | WO 95/07971 | 3/1995 |

OTHER PUBLICATIONS

Chemical Abstracts, vol. 107, No. 14, 1987; Columbus, OH, US; "Preparation of Pure Calcium Carbonate" XP002026052.
Patent Abstracts of Japan, JP 57172296; Shiraishi Chuo Kenkyusho:KK, Amorphous Calcium Carbonate, its Preparation and Material for Releasing Substance Adsorbed to it at Proper Rate, Apr. 12, 1984.
Patent Abstracts of Japan, JP 02416724, Shikoko Chem. Corp., Production of Calcium Carbonate Composition and Polymer Composition, May 13, 1992.
Patent Abstracts of Japan, JP 63226340, Sanyo Kokusaku Pulp Co., Ltd.; Production of Hollow and Spherical Vaterite Type Calcium Carbide and Stabilization Thereof, Jun. 13, 1990.

* cited by examiner

*Primary Examiner*—Stuart Hendrickson
(74) *Attorney, Agent, or Firm*—Woodard, Emhardt, Moriarty, McNett & Henry LLP

(57) ABSTRACT

Methods of obtaining a solution of calcium ions from lime (e.g. carbide lime) are disclosed. In one aspect the method comprises (i) treating the lime with an aqueous solution of a polyhydroxy compound (preferably sorbitol) having three or more hydroxy groups and a straight chain of 3 to 8 carbon atoms; and (ii) optionally separating insoluble impurities from the solution resulting from (i). In another aspect the method comprises (iii) treating carbide lime with an aqueous solution of a polyhydroxy compound (e.g. sorbitol or sucrose) to extract calcium from the carbide lime; and (iv) separating insoluble impurities from the solution resulting from (i). The solutions obtained may be treated with precipitating agent to obtain a solid calcium containing product. The product may be calcium carbonate obtained by treating the solution with carbon dioxide as the precipitating agent.

16 Claims, No Drawings

LIME TREATMENT

CROSS REFERENCE TO RELATED APPLICATIONS

This application is a continuation and claims priority from the U.S. patent application Ser. No. 09/857,680, filed Sep. 13, 2001, now abandoned, which is incorporated herein by reference in its entirety.

The present invention relates to a method of treating lime and more particularly, but not exclusively to the treatment of lime containing insoluble impurities, to obtain a purified solution of calcium ions and also the use of said processing method to obtain useful, solid calcium containing products from the lime. The invention relates more particularly, but again not exclusively, to the treatment of carbide lime.

For the purposes of the present specification the term "lime" is used to describe both $CaO$ and $Ca(OH)_2$ depending on the context.

Examples of prior art relevant to the present invention include U.S. Pat. No. 3,340,003 which discloses the processing of dolomite by calcining and then dissolving the calcium oxide produced at high pH to obtain a solution of calcium sucrate.

Also U.S. Pat. No. 5,332,564 discloses the use of a calcium hydroxide water slurry with a very small amount of sucrose to produce rhombic precipitated calcium carbonate.

There is a need for a process which will enable a solution of calcium ions from lime particularly, but not necessarily, a lime containing insoluble impurities since the resulting calcium ion solution can be used for producing relatively valuable products. The need is particularly great in relation to carbide lime which is a by-product in the production of acetylene by the reaction of calcium carbide and water according to the equation

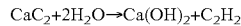

$$CaC_2 + 2H_2O \rightarrow Ca(OH)_2 + C_2H_2$$

More particularly, carbide lime is comprised of calcium hydroxide and impurities resulting from the original calcium carbide and possibly also from the conditions under which the acetylene is produced.

The carbide lime is produced in amounts of approximately 3.5-4 times the weight of acetylene and is produced in dry powder form coming from a dry gas generator but mostly it is a water slurry from wet generators. Carbide lime is also known as carbide sludge, generator slurry, lime sludge, lime hydrate, and hydrated carbide lime.

Carbide lime is a grey-black substance. Typically it consists of around 90% by weight of calcium hydroxide (based upon the solids content of the carbide lime), the remainder being impurities which depend upon the method used to manufacture the acetylene and also upon the source of the materials used to manufacture the calcium carbide (normally made by roasting calcium oxide and coal). The main impurities are the oxides of silicon, iron, aluminium, magnesium, and manganese combined with carbon, ferrosilicon and calcium sulphate. Additionally if the carbide lime is stored outside, calcium carbonate, formed by the reaction of calcium hydroxide with carbon dioxide, may be present as an impurity.

Due to the impurities present in the carbide lime it has a low market value and is difficult to sell. The limited number of uses include use as a cheap base to neutralise acids or use in a slightly modified form as an agricultural fertiliser (Czechoslovakian Patent Application CS 8002961-Jansky).

Since it does not have a significant commercial use, and also because the impurities which it contains renders disposal difficult, there are millions of tonnes of carbide lime stored in carbide lime pits all over the world. These pits are an ever increasing environmental problem.

Several methods as outlined below have been proposed to purify carbide lime but have various disadvantages:

a) Heating. The water and carbon impurities in the carbide lime can be removed by heating carbide lime in an oven at a temperature of at least 800° C. to yield a white lime. However, this process is expensive to operate and has the disadvantage that oxide impurities are not removed.

b) Simple filtration. The sludge may be subjected to a filtration operation. Unfortunately the particle size of the impurities contained within the carbide lime is similar to that of the particles of calcium hydroxide at 1 μm to 50 μm. Also as the impurities in the carbide lime tend to block filters with a thick sludge, the filters suffer from reduced efficacy and need constant replacement. Therefore simple filtration is ineffective.

c) Dissolution of calcium hydroxide in water followed by filtration. As calcium hydroxide is sparingly soluble in water and as most of the impurities in carbide lime are insoluble, the calcium hydroxide can be extracted into an aqueous solution which is then filtered to remove the impurities. Unfortunately calcium hydroxide is only sparingly soluble in water, some 650 cubic meters of water are needed to dissolve one tonne of calcium hydroxide, therefore this method is impractical industrially.

d) Solution of calcium hydroxide in water, using an ammonium salt as a solvating aid, followed by filtration. This method is identical to that described in (c) with the exception that anions, provided as chloride or the nitrate, are used to increase the solubility of the calcium hydroxide in water. This method is effective in reducing the amount of water needed to dissolve the calcium hydroxide but suffers from the drawback that the liquor containing the ammonium poses an effluent problem due to the relatively high ammonium salt concentrations, unless the ammonium solution is recycled after precipitation of the calcium with carbon dioxide.

Similar problem are also encountered in purifying other types of low quality (i.e. high impurity) lime.

The difficulties involved in purifying carbide lime and other low quality limes means that, in spite of the large available amounts of these materials, they are not used as a source of calcium for the production of higher value calcium products which have significant industrial applications. One example of such a product is Precipitated Calcium Carbonate (PCC) which is used as a functional filler in materials such as; paints, paper, coatings, plastics, sealants and toothpaste.

PCC is currently manufactured by the following methods:

a) Reacting an aqueous slurry of lime with carbon dioxide. This method suffers from the disadvantage that it is slow due to the low solubility of lime.

b) Reacting a solution of lime with carbon dioxide. In this case problems arise initially as lime is only sparingly soluble in water (typical saturated concentration 2.16× $10^{-2}$ molar at room temperature). The low concentration presents separation problems once the conversion to PCC is complete. Also due to the low lime concentration the reaction equilibria are such that, in the reaction with carbon dioxide, only about 30% of the lime is converted to PCC, the remainder being converted to $Ca(HCO_3)_2$, which remains in solution.

It is therefore an object of the present invention to obviate or mitigate the above mentioned disadvantages.

According to a fast aspect of the present invention there is provided a method of obtaining a solution of calcium ions from lime, the method comprising
(i) treating the lime with an aqueous solution of a polyhydroxy compound having three or more hydroxy groups and a straight chain of 3 to 8 carbon atoms; and
(ii) optionally separating insoluble impurities from the solution resulting from (i)

We have found that the polyhydroxy compound solution as defined in the previous paragraph is an excellent solvent for the calcium and allows a much higher amount (e.g. about 65 g/l) of the calcium ions present in the lime to go into solution than would be the case of use of only water. The method of the invention provides an efficient procedure for extracting calcium from lime. After removal of insoluble impurities, there remains a purified solution of calcium ions which may be used for the production of calcium containing products of considerably higher commercial value than carbide lime as discussed more fully below.

The lime used in the method of the invention may be any lime containing impurities that are insoluble in an aqueous solution of a polyhydroxy compound. A preferred example of such a lime is carbide lime, which contains carbon, ferrosilicon, calcium sulphate and the oxides of iron, silicon, aluminum, magnesium and manganese as insoluble impurities.

This aspect of the invention may however also be applied to the treatment of other types of lime (provided either as CaO or Ca(OH)$_2$ containing insoluble impurities to obtain a solution of calcium ions therefrom. Exemplary of such other limes are, low grade limes, the products obtained by calcination of limestone and that obtained by calcination of dolomite. In the latter case the method of the invention ensures separation of the MgO or Mg(OH)$_2$ since each is insoluble in the solution of the polyhydric alcohol. It is also possible for this aspect of the invention to be applied to the treatment of limes which contain no or relatively low amounts of impurities.

The polyhydroxy compound used in the method of the invention has a straight chain of 3 to 8 carbon atoms and should have significant solubility in water under the conditions employed.

Examples of polyhydroxy compounds which may be used are of the formula:

where n is 1 to 6. Thus for example the polyhydroxy compound may be glycerol (n=1). It is however more preferred that n is 2 to 6 and it is particularly preferred that the polyhydroxy compound is a sugar alcohol (a "hydrogenated monosaccharide"). Examples of sugar alcohols include sorbitol, mannitol, xylitol, threitol and erythritol.

Also useful as polydroxy compounds that may be employed in the invention are those having a straight chain of n carbon atoms where n is 4 to 8 and (n−1) of the carbon atoms have a hydroxyl group bonded thereto. The other carbon atom (i.e. the one without the hydroxyl group) may have a saccharide residue bonded thereto. Such compounds are hydrogenated disaccharide alcohols and examples include maltitol and lactitol.

Particularly preferred for use in the invention are the hydrogenated monosaccharide (e.g. sorbitol) and disaccharide alcohols because of their thermal stability which can be important for subsequent processing of the calcium ion solution (see below).

Mixtures of the above described polyhydric alcohols may also be used. Thus it is possible to use industrial sorbitol which, of the solids present, comprise about 80% sorbitol together with other polyhydroxy compounds such as mannitol and disaccharide alcohols. Examples of industrial sorbitol include Sorbidex NC 16205 from Cerestar and Meritol 160 from Amylum.

Depending on its solubility in water at the temperature used in the method, the polyhydroxy compound will generally be employed as a 10% to 80% by weight solution in water. When the polyhydroxy compound is a sugar alcohol, it will generally be used as 10% to 60% by weight solution, more preferably 15% to 40% by weight solution in water. In contrast glycerol will generally be used as 60% to 80% by weight solution in water, more preferably 65% to 75% by weight solution.

A second aspect of the invention relates to the treatment of carbide lime to obtain a solution of calcium ions therefrom. According to this aspect, the invention provides a method of obtaining a solution of calcium ions from carbide lime comprising:
(i) treating the carbide lime with an aqueous solution of a polyhydroxy compound to extract calcium from the carbide lime, and
(ii) separating insoluble impurities from the solution resulting from (i).

The polyhydroxy compound used in the second aspect of the invention may be as described for the first aspect of the invention. Additionally however this polyhydroxy compound may be a saccharide (e.g. a mono- or di-saccharide).

Examples of saccharides which are useful in the invention include glucose, fructose, ribose, xylose, arabinose, galactose, mannose, sucrose, lactose and maltose. Examples of saccharide derivatives which are useful in the invention include saccharide alcohols such as sorbitol and mannitol. It is particularly preferred that (for the second aspect of the invention) the polyhydroxy compound is chosen from the group consisting of sucrose, glucose, sorbitol and glycerol.

Depending on its solubility in water at the temperature used in the method of the second aspect, the polyhydroxy compound will generally be employed as a 10% to 80% by weight solution in water. When the polyhydroxy compound is a saccharide, or a derivative thereof, e.g. a sugar alcohol, it will generally be used as 10% to 60% by weight solution, more preferably 15% to 40% by weight solution in water. In contrast, glycerol will generally be used as 60% to 80% by weight solution in water more preferably 65% to 75% by weight solution.

The invention (both the first and second aspects) will be described fully with reference to the treatment of carbide lime but it is applicable mutatis mutandis to other forms of lime.

To produce a purified solution of calcium ions from carbide lime, it would generally be appropriate to extract an amount of carbide lime providing 3 to 12, more preferably 3 to 7 and ideally about 5 parts by weight calcium hydroxide with 100 parts by weight of the aqueous solution of the polyhydroxyl compound. Dry carbide lime from an acetylene generator may be extracted without further processing. However, in the case of wet carbide lime it will generally be preferred that this will be allowed to settle and subsequently dewatered prior to the extraction step. This can be best be done by filtration.

If the polyhydroxy compound used for extracting the calcium ions is susceptible to thermal decomposition then the extraction step may be effected at a temperature of 5° C. to 60° C., although we do not preclude the use of temperatures outside this range. The admixture of the carbide lime and aqueous solution of the hydroxy compound should also be agitated to ensure maximum extraction of calcium ions into the aqueous liquor. Treatment times to obtain a desired degree of extraction will depend on factors such as the temperature at which the extraction is performed, degree of agitation, and concentration of the polyhydroxy compound but can readily be determined by a person skilled in the art.

Subsequent to the extraction step, the calcium ion solution is separated from insoluble impurities. Conveniently separation is effected by filtration, e.g. using a microfiltration unit, but other methods may be employed. If necessary a flocculating agent may also be used.

The resultant product is a purified calcium ion containing solution which may be used, for example, as a feedstock for producing industrially useful calcium containing, solid products. Such products are most conveniently produced by a precipitation reaction in which a chemical agent is added to the solution to precipitate the desired produce. Thus, for example, by bubbling carbon dioxide through the purified calcium ion containing solution it is possible to produce Precipitated Calcium Carbonate. Other precipitating agents which may be used include phosphoric acid, sulphuric acid, oxalic acid, hydrofluoric acid and citric acid.

Generally it will be appropriate to add the precipitating agent in at least stoichiometric amounts to the calcium contained in the solution. Alternatively or additionally, the supernatant liquor remaining after the precipitation reaction may be recycled for use in extracting calcium from a fresh batch of carbide lime. If the supernatantant is to be recycled then it is desirable to dewater the carbide lime to prevent too much water entering the recycle stream and undesirably diluting this solution of the polyhydroxyl compound. Thus, as indicated previously, if the wet carbide lime is to be treated it should be allowed to settle and then dewatered. Alternatively or additionally, the supernatant may be heated to effect a degree of concentration thereof (by evaporation of water). If the supernatant is to be heated then it is highly desirable that the polyhydroxy compound is a sugar alcohol since these are resistant to heating and do not "brown" at the temperature required for such concentration. This ensures that the recycled, "concentrated" solution of the polyhydric alcohol is colourless and does not cause discolouration of the precipitated calcium carbonate. This is in contrast to, say, the use of sucrose as the extractant of the calcium ions where the concentrated, recycled sucrose solution may cause discolouration of the precipitated calcium carbonate although this may be tolerated for certain applications.

For the production of Precipitated Calcium Carbonate, carbon dioxide may be bubbled through the purified calcium ion solution using a conventional carbonation reactor. This reaction may be conducted at ambient temperature. Additives to coat the PCC, e.g. stearic acid derivatives, may be added at a later stage if required.

The PCC may be dewatered, washed and dried using equipment well known in the art.

The particle size of the PCC produced will depend upon parameters such as reaction time, temperature, $CO_2$ concentration and agitation speed.

The described method of producing PCC has the following advantages.

1. The method allows the production of high purity PCC.
2. The calcium ions, from which the calcium carbonate is generated are present in solution at a much higher concentration than would be the case of treating a suspension of lime.
3. Compared to the use of a suspension of lime for generating PCC, the method of the invention does not result in PCC being "deposited" on lime particles.
4. The method of the invention yields a PCC of narrow size distribution, small particle size and good colour.

The invention will be further illustrated by the following, non-limiting Examples

EXAMPLE 1

To a 2 liter round bottomed flask fitted with a mechanical stirrer and thermometer was charged 250 grams of sorbitol in 660 grams of water at ambient temperature. To the resultant clear solution was charged 100 grams of crude carbide lime containing 50% moisture. The mixture was then stirred for a minimum of 20 minutes.

When the resulting solution containing the undissolved impurities was filtered the clear filtrate obtained was found to contain 4.1% w/w calcium hydroxide. The filtrate was charged to a carbonation reactor for precipitation of calcium carbonate by reaction with carbon dioxide gas, using the method described below.

To a 2 liter round bottomed flask fitted with a mechanical stirrer, pH probe and gas sparge tube was charged 4% calcium hydroxide in sorbitol solution (1000 grams). After sparging the mixture with carbon dioxide for approximately 10 minutes the reaction to calcium carbonate was complete, indicated by the pH change from 11.8 to 7.0.

The precipitated calcium carbonate (PCC) was filtered and dried to yield 54.2 grams of calcium carbonate. The theoretical yield is 55.1 grams, implying a yield of 98.3%.

The fine, white PCC powder had the following properties.

|  | PCC | Carbide Lime |
| --- | --- | --- |
| Mean Particle Size | ~2 µm | 1-50 µm |
| Crystal Structure | Calcite Rhombic Structure | — |
| Acid Insolubles | <0.2% | |
| Residual Fe | <0.05% | 0.12% |
| Residual Mg | <0.05% | 0.07% |
| Residual S | <0.1% | 0.35% |
| Residual Al | <0.05% | 1.15% |
| Residual Silica | <0.1% | 1.5% |

EXAMPLE 2

To a 120 liter plastic drum was charged 43.2 kg water, 35.7 kg of a 70% w/w solids in water commercial grade of sorbitol (Sorbidex NC 16205) and 21.0 kg of a 22% w/w solids in water crude carbide lime suspension.

The mixture was stirred for 15 minutes. Then 1.5 liter of a flocculent stock solution was added to arrive at a final concentration of 25 ppm flocculant (Magnafloc LT25 from Ciba) on the total mixture.

The contents of the drum were stirred, for 10 minutes and then the flocculant were allowed to settle for a period of 1 hour.

The resulting lime solution and settled impurities were filtered. The clear filtrate contained about 4.0% w/w of calcium hydroxide.

28 kg of the filtrate liquor was charged to a stainless steel carbonation reactor fitted with a turbine impeller, gas sparge ring, pH and temperature probe, feed liquor inlet and calcium carbonate product outlet.

The agitator was set at 600 rpm and the reactor contents were sparged with a gas mixture of 20% w/w carbon dioxide and 80% w/w nitrogen at a rate of 80 g carbon dioxide per minute.

After approximately 20 minutes the carbonation reaction was completed, indicated by a pH change from 12.4 to about 7.0.

The formed precipitated calcium carbonate suspension was discharged from the reactor, filtered and washed in a pilot filter press.

The filter cake was dried to yield about 1.5 kg PCC, implying a yield of about 99%.

The calcite PCC powder had the following properties:

| | |
|---|---|
| Mean particle size (Malvern Mastersizer) | 1.93 microns |
| Brightness (R457) | 97.3 |
| Tap density | 0.97 g/cc |
| HCl insolubles | 0.13% |
| pH value | 9.3 |
| BET surface area | 4 m$^2$/g |
| MgO | <0.05% |
| Al$_2$O$_3$ | 0.07% |
| SiO$_2$ | 0.16% |
| Fe | 1 ppm |
| Mn | <1 ppm |
| SO$_3$ | 0.03% |

EXAMPLE 3

57.5 grams of carbide lime, containing approximately 7.5 grams of impurities such as calcium carbonate, oxides and sulphates of silicon, iron, aluminium, magnesium, and manganese with carbon and ferrosilicon, were dissolved with stirring for 15 minutes in a solution containing 250 grams of sucrose in 750 grams of water.

The resulting solution containing undissolved black covered sludge-like impurities was filtered.

The clean solution containing about 50 grams purified calcium hydroxide was transferred to a carbonation reactor for precipitation of calcium carbonate by reaction with carbon dioxide gas.

After 10-20 minutes of bubbling carbon dioxide the reaction to calcium carbonate was complete. The precipitated calcium carbonate (PCC) was filtered out of the suspension and dried, yielding 67 grams of calcium carbonate, (expected ~67.5 grams, implying a yield of over 99%).

The PCC powder had the following properties

| | |
|---|---|
| Mean Particle Size | 3 μm |
| Crystal Structure | Calcite Rhombic Structure |
| Acid Insolubles | <0.06% |
| Residual Fe | <3 ppm |
| Residual Mg | <3 ppm |
| Residual Mn | <3 ppm |
| Residual S | <3 ppm |
| Residual Al | 33 ppm |
| Residual Silica | 300 ppm |

The invention claimed is:

1. A method of obtaining precipitated calcium carbonate from carbide lime, comprising the steps of:
   (a) dissolving carbide lime in an aqueous solution comprising 10% to 80% of a polyhydroxy compound of the formula: HOCH$_2$(CHOH)$_n$CH2OH; where n is 2 to 6;
   (b) removing insoluble impurities from the solution resulting from (a); and
   (c) contacting the purified solution resulting from (b) with CO$_2$ to precipitate calcium carbonate from the purified solution while allowing the solution to achieve a temperature in excess of 25° C.

2. A method according to claim 1 wherein said polyhydroxy compound comprises one or more members selected from the group consisting of sorbitol, xylitol, threitol, and mannitol.

3. A method according to claim 1 wherein said polyhydroxy compound comprises sorbitol.

4. A method according to claim 1 wherein the polyhydroxy compound is employed as a 10% to 60% by weight solution.

5. A method according to claim 1 wherein the amount of carbide lime is such as to provide 3-12 parts by weight per 10 to 80% by weight of the polyhydroxy compound.

6. The method of claim 1 wherein said polyhydroxy compound is a polyhydroxy sugar alcohol.

7. The method of claim 1 wherein said polyhydroxy compound is a polyhydroxy compound of the formula: HOCH$_2$(CHOH)$_n$CH2OH; where n is 4.

8. A method of obtaining precipitated calcium carbonate from lime, comprising the steps of:
   (a) dissolving a lime-containing material in an aqueous solution comprising 10% to 80% of one or more polyhydroxy compounds of the formula: HOCH$_2$(CHOH)$_n$CH2OH; where n is 2 to 6;
   (b) removing insoluble impurities from the solution resulting from (a); and
   (c) contacting the purified solution resulting from (b) with CO$_2$ to precipitate calcium carbonate from the purified solution while allowing the solution to achieve a temperature in excess of 25° C.

9. The method according to claim 8 wherein the lime is a product of the calcining of limestone or dolomite.

10. A method according to claim 8 wherein said polyhydroxy compound comprises one or more members selected from the group consisting of sorbitol, xylitol, threitol, and mannitol.

11. A method according to claim 8 wherein said polyhydroxy compound comprises sorbitol.

12. A method according to claim 8 wherein said polyhydroxy compound comprises about 80% sorbitol.

13. A method according to claim 8 wherein said polyhydroxy compound is sorbitol.

14. A method according to claim 8 wherein the polyhydroxy compound is employed as a 10% to 60% by weight solution.

15. A method according to claim 14 wherein the polyhydroxy compound is employed as a 15% to 40% by weight solution.

16. A method according to claim 8 wherein the amount of carbide lime is such as to provide 3-12 parts by weight per 10 to 80% by weight of the polyhydroxy compound.

* * * * *